Patented Mar. 9, 1943

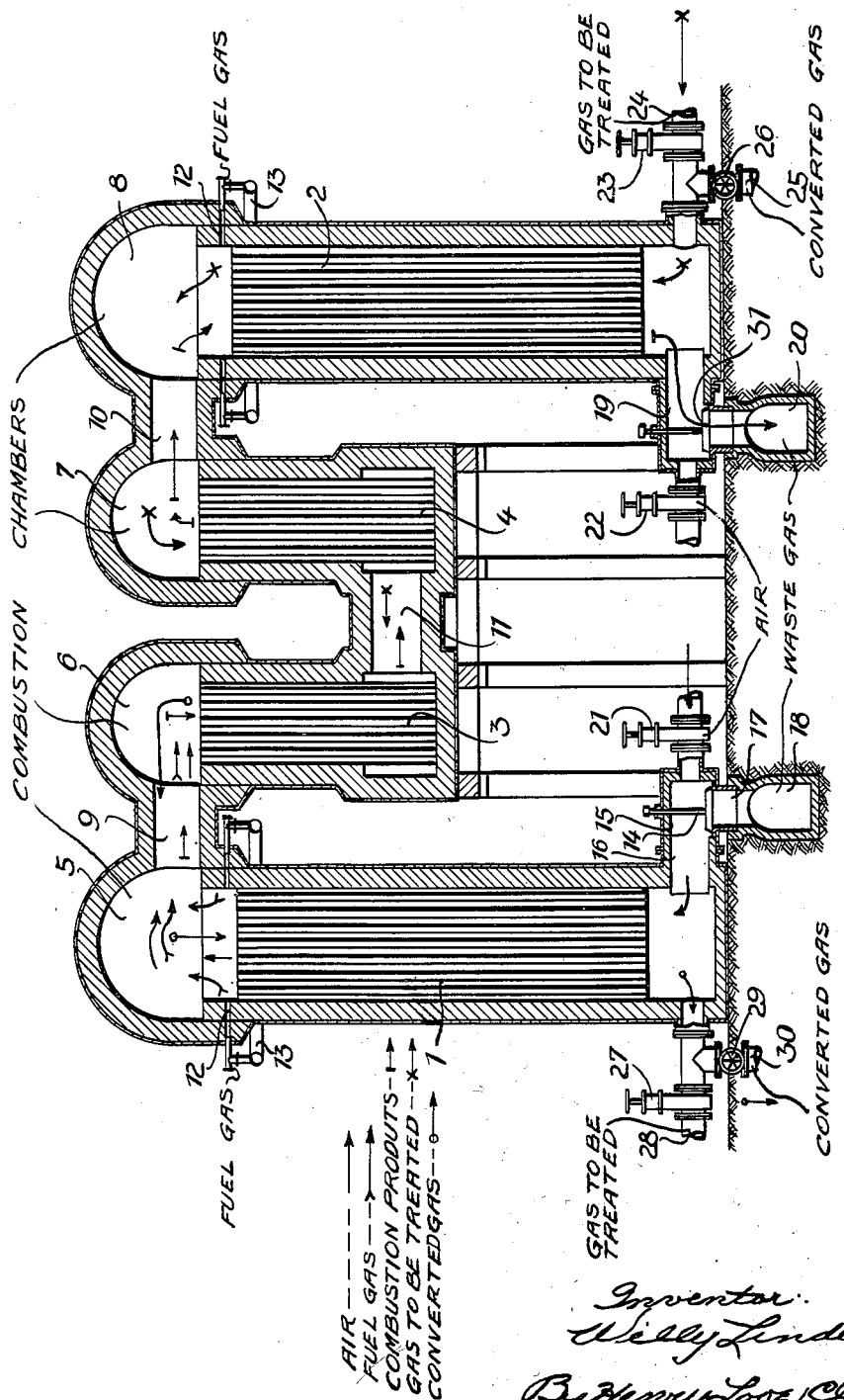

2,313,157

UNITED STATES PATENT OFFICE 2,313,157

PROCESS FOR CARRYING OUT ENDO-THERMIC GAS REACTIONS AT HIGH TEMPERATURES

Willy Linder, Essen, Germany, assignor, by mesne assignments, to Koppers Company, Pittsburgh, Pa., a corporation of Delaware Application July 24, 1939, Serial No. 286,178
In Germany July 28, 1938

4 Claims. (Cl. 252—373)

The present invention relates to a process of carrying out endothermic gas reactions at increased temperatures, and more particularly to the conversion of methane or gases containing methane by means of steam into carbon monoxide and hydrogen, or similar endothermic processes in which the gas or the mixture of gas and steam is heated in regenerative gas heaters to the reaction temperature and the chequerwork of the gas heaters or regenerators is raised periodically to a high temperature by means of hot combustion gases passed through the heater in countercurrent to the gas or gas-steam mixture to be converted.

The carrying out of such endothermic gas reactions at high temperatures is rendered difficult as a large quantity of heat of high temperature is required for heating up that zone of the regenerator in which the gases to be treated, after being raised to the necessary reaction temperature, undergo the endothermic reaction. In order to cover the increased heat consumption in the high temperature zone of the regenerator, a comparatively large quantity of heating gases has to be passed through the regenerator. In consequence thereof, the low temperature zones of the regenerator are passed by too large quantities of gas of low temperature, the sensible heat of which is not utilized in the chequerwork, so that the waste gases leaving the system have an undesired high temperature. The thermal efficiency of such a plant is very low due to the high temperature of the waste gases.

In order to overcome the difficulties above mentioned when carrying out a process of endothermic gas reactions at a high temperature, I have formerly suggested the idea of withdrawing from the regenerator in which the gases to be treated are heated to the reaction temperature, and preferably from the high temperature zone of the regenerator, part of the hot heating-up gases and utilizing the sensible heat of this partial stream of hot heating-up gases in special heat exchangers, as in steam boilers. I achieved this idea in such a way that the waste gases discharging at the colder end of the regenerator are of a suitably low temperature. My former proposition is, however, only advantageous in those cases when the sensible heat from the partial stream of hot heating-up gases may be utilized for other purposes.

Now, my present invention has for its object to improve the thermal efficiency of regeneratively operated contrivances for carrying out endothermic gas reactions at high temperatures in such a manner that the same substantially corresponds to that of standard regenerative system, i. e. the waste gas temperatures arrived at are equal to those attained as in the case of usual regenerative gas heaters.

My invention essentially consists in the idea of adopting a system consisting of at least three regenerators which are connected with one another and between each two a combustion chamber is provided, the delivery of the heating media, such as preheated air and preheated or cold fuel gas, and perhaps also preheated or cold inert gases, being such that the heating media are preheated in one regenerator and the hot combustion gases give-off their heat to the chequerwork of the other two regenerators, in order to give up the heat to the gases or gas-steam mixture to be treated in those two regenerators during the next part of the operating cycle, while when leading-through the gases to be treated, the two regenerators serve for heating-up these gases for their conversion and the third one serves for absorbing and storing the sensible heat from the converted gases.

Furthermore my invention comprehends a special process for operating the apparatus constructed according to my present invention. According to the invention the gases to be brought to reaction are first of all led in counter-current to the direction the heating-up gases took when flowing through the apparatus during the preceding operating period, and after a certain time, the direction of flow of the gases to be treated is reversed, while during the following heating-up period, the heating gases flow through the apparatus in opposite direction to the direction taken during the preceding heating-up period. By suitably measuring the time in which the gases to be treated flow through the apparatus in the various directions, it is possible to bring the whole apparatus to a heat equilibrium, so that the heat produced by the heating media is efficiently utilized for the reaction or reactions to be carried out in the apparatus.

With the above and other objects and features of my present invention in view, I shall now describe a preferred embodiment thereof on the lines of the accompanying drawing showing schematically an advantageous apparatus for the purpose in vertical longitudinal section.

The apparatus consists of two regenerators 1 and 2 between which is arranged a third regenerator divided into the sections 3 and 4 for structural reasons. The regenerators may for instance be of the design which has proved successful for blast-furnace air heaters. Above the chequerwork in the regenerators there are provided arched-spaces 5, 6, 7, 8. The arched spaces 5 and 6 and the arched spaces 7 and 8 are interconnected each by a horizontal channel 9, 10. The sections 3 and 4 of the regenerator are connected with each other by a channel 11.

The arched spaces 5 and 8 serve as combustion chambers. A series of gas nozzles 12 which are supplied with fuel gas, for instance coke oven gas from a gas pipe 13 terminates into the side of the spaces 5 and 8.

The process according to the invention is about as follows:

Assuming that the regenerator 1 is to serve to heat-up the heating media and that the heat therefor was stored therein during a preceding operating cycle. The valves 14, 21 in the valve casing 15 which on the one side is connected with the regenerator by the pipe 16 and on the other side by the pipe 17 with the chimney are adjusted in such a manner that the connecting pipe 17 leading to the chimney flue 18 is closed by the waste gas valve 14 and air may flow into the casing 15 through open air valve 21. The hot air rises upwards in the regenerator 1 and thus attains the necessary high temperature for instance 950 to 1,000 degrees centigrade. In the arched combustion space 5, the air meets with the fuel gas which is introduced through the gas inlet nozzles 12. Gas and air are burned in 5 and pass through the channel 9 into the arched combustion space 6 of the central regenerator 3, 4. The hot waste gases then pass through generator 3, 4, and thereby transfer a part of their heat to the chequerwork in 3, 4, and finally leave the arched combustion space 7 of the regenerator section 4 through the pipe 10 reaching the arched combustion space 8 of the regenerator 2. In the regenerator 2, the hot heating-up gases flow downwards, giving off the rest of their heat to the chequerwork in the regenerator 2. From the base of the regenerator 2, the cooled down heating-up gases then flow through the valve casing 19 and through open waste gas valve 31 into the chimney flue 20, air valve 22 being closed.

As soon as the temperature in the regenerator 1 has dropped so far that the combustion temperature in the arched space 5 falls below the desired value, the heating up process is stopped. The valves 21, 31 provided for the casings 15 and 19 are then closed, thus interrupting the connection of the regenerators 1 and 2 with the stack flue and the outer atmosphere. Thereupon the valve 23 for the regenerator 2 is opened, which controls the pipe line 24 terminating at the base of the regenerator 2, for the purpose of leading the gas or gas-steam mixture to be treated into regenerator 2. Furthermore an outlet pipe line 25 extends from the base of the regenerator 2 said outlet pipe being controlled by a valve 26. The pipe line 25 serves for the issue of converted gases from the set from generator 2.

The regenerator 1 is likewise provided with a valve 27 which governs the flow of gas to be treated through the gas inlet pipe 28, and is also provided with the outlet valve 29 which controls an off-take 30 for converted gas.

When the valve 23 for the regenerator 2 is opened the outlet valve 29 for the regenerator 1 is also opened. The gas or gas-steam mixture to be converted then enters the regenerator 2. It rises upwards in the regenerator 2 in which it is raised to a high temperature by means of the chequerwork, it then enters in succession the regenerators 4 and 3 where it attains its maximum temperature. When converting for instance methane with steam, the temperature of the gases withdrawing from the regenerator 3 may be 1300° C. At this temperature, the methane has practically completely been converted with steam.

The hot reaction gases then flow downwards in the regenerator 1 and enter the pipe line 30 for converted reaction gas through the open valve 29.

In order to establish the heat equilibrium in the apparatus according to the invention, the gas delivery to the regenerator 2 is interrupted after a given operating period by closing the valve 23. At the same time, the valve 26 of the regenerator 2 is opened and the valve 29 in the regenerator 1 is closed. Hereupon the valve 27 of the regenerator 1 is opened so that the gas or gas-steam mixture to be converted enters the regenerator 1 and from there it flows through the apparatus in a direction opposite to the direction of the gas or of the gas-steam mixture in the preceding operating cycle. The blowing of gas or gas-steam mixture into the regenerator 1 is continued until the temperature of the regenerator 4 has dropped below the permissible reaction temperature. Thereupon the delivery of gas or gas-steam mixture is interrupted by closing the valve 27. Furthermore the valve 26 of the regenerator 2 is likewise closed after being opened beforehand for purging the valuable gas contained in the system which is displaced by a steam purge or in any other suitable manner. Moreover it is also possible to force away the blow gases of a previous heating up phase present in the spaces, in a similar manner, before introducing the valuable gas or gas-steam mixture.

After the valves 23, 26, 27 and 29 are closed the regenerator system may be heated up again. According to the invention, the heating gas and air are burnt in the combustion chamber 8 of the right hand regenerator 2, i. e. the heating direction is now contrary to that of the preceding heating up period.

The working process above explained may for instance also be exemplified by the following figures when converting coke oven gas with steam.

It is assumed that the following reaction is to be carried out in the apparatus:

$$0.510 \ Nm^3 \text{ of coke oven gas} + 0.658 \ Nm^3 H_2OD = 1 \ Nm^3 \text{ of final gas} + 0.475 \ Nm^3 H_2OD$$

N=gas at normal, i. e., 0° C. and 1 atmosphere of pressure, or as expressed in American practice, gas at standard conditions, i. e., 32° F. and 30″ Hg.
$m^3$=cbm.($\times$35.3165=cu. ft.)
$H_2OD$="Wasser-Dampf"=steam
kcal.=kilocalorie. kcal.$\times$3.970=B. t. u.
kcal./$m^3$=kilocalorie per cbm. kcal./$m^3 \times$ 0.1124=B. t. u. per cu. ft.

The quantities of heat given away and absorbed in the various parts of the regenerator system are shown in the following table the figures of which indicate kcal. per 1 N$m^3$ of final gas:

| | Waste heat | Regenerator 1 | Gas | Regenerator 3, 4 | Gas | Regenerator 2 | Waste heat |
|---|---|---|---|---|---|---|---|
| Heating-up | → | +1132 −1060 | | ±0 +542 | | ±0 +870 | 278 |
| Blow-run | ←24 | +218 | +630 | −185 | | −150 | |
| Do | → | −290 | | −357 | | +412 | 58 |
| Heating-up | ←278 | ±0 +870 | | ±0 +542 | +630 | +1132 −1060 | |
| Blow-run | | −150 | | −185 | | +218 | 24 |
| Do | ←58 | +412 | | −357 | | −290 | |
| | | +1132 | | ±0 | | ±0 | |

Heat consumption during the heating up process:
1060+630=1690=542+870+278 kcal./N$m^3$ final gas.
Heat balance:
42+630=312+278+24+58=672 kcal.

The above table and the heat balance show that by suitably calculating the duration of the two blow-run periods, the heat introduced into the system by burning the heating gas and air may be highly utilized for the regenerative principle in accordance with the usual regenerator efficiency. The waste heat temperature remains always below say 300 degrees centigrade which insures the most favourable working of the process in the plant.

In the foregoing, the invention is described in connection with a plant in which coke oven gas serves to heat up the regenerators. Instead of this it is also possible to use a gas of a lower calorific value, for example generator gas. In this case, special regenerators are provided for preheating the fuel gas of lower calorific value. The regenerators, 1 and 2, may also be divided up by suitable partitions into two spaces for the separate preheating of gas and air, the inlet and outlet valves for the regenerators would have to be supplemented accordingly.

I have now above described my present invention on the lines of a preferred embodiment thereof, but my invention is not limited in all its aspects to the mode of carrying it out as described and shown, since the invention may be variously embodied within the scope of the following claims.

I claim:
1. A cycle for use in a process of carrying out endothermic gas reactions at high temperature to produce endothermic reaction products involving a preheating step preceding an endothermic reaction step and a cooling step following the endothermic reaction step, which cycle comprises: passing gaseous combustion media for the cycle first through non-combustible refractory material in an end regenerator, preheating the media for combustion and cooling the refractory material in the regenerator for the cooling step, and passing it thence into a combustion chamber; effecting combustion therein of the preheated gaseous media and flowing the products of combustion first through non-combustible refractory material in an intermediate regenerator and thereby heating the refractory material therein to the reaction temperature for the endothermic reaction step, passing the combustion products thence out through non-combustible refractory material in another end regenerator and thereby heating the same for the preheating step and cooling the waste gas to below 300° C.; then leading the gases to be reacted through the non-combustible refractory material of the three regenerators of the set in series, first of all countercurrent to the direction the preceding heating-up gases took, and concluding with a run in the same direction as the preceding heating-up gases took, and thereby producing the endothermic reaction products and cooling the end regenerator through which the gaseous heating media of the cycle entered to a temperature at which the waste gases of the heating-up step of the next cycle will leave at below 300° C., the direction of flow through the set of gaseous heating media for the cycle being countercurrent to the direction of flow of the concluding run of the gas for reaction of the previous cycle.

2. A cycle for use in a process of carrying out endothermic gas reactions at high temperature to produce entdothermic reaction products involving a preheating step preceding an endothermic reaction step and a cooling step following the endothermic reaction step, which cycle comprises: passing gaseous combustion media for the cycle first through non-combustible refractory material in an end regenerator, preheating the media for combustion and cooling the refractory material in the regenerator for the cooling step, and passing it thence into a combustion chamber; effecting combustion therein of the preheated gaseous media and flowing the products of combustion first through non-combustible refractory material in an intermediate regenerator and thereby heating the refractory material therein to the reaction temperature for the endothermic reaction step, passing the combustion products thence out through non-combustible refractory material in another end regenerator and thereby heating the same for the preheating step and further cooling the waste gas; then leading the gases to be reacted through the non-combustible refractory material of the three regenerators of the set in series, first of all countercurrent to the direction the preceding heating-up gases took, and concluding with a run in the same direction as the preceding heating-up gases took, and thereby producing the endothermic reaction products and cooling the end regenerator through which the gaseous heating media of the cycle entered to a temperature at which the waste gases of the heating-up step of the next cycle will leave at a low temperature, the direction of flow through the set of gaseous heating media for the cycle being countercurrent to the direction of flow of the concluding run of the gas for reaction of the previous cycle.

3. A cycle for use in a process of carrying out endothermic gas reaction of gaseous hydrocarbon and steam at high temperature to produce carbon monoxide and hydrogen endothermic reaction products involving a preheating step preceding an endothermic reaction step and a cooling step following the endothermic reaction step, which cycle comprises: passing gaseous combustion media for the cycle first through non-combustible refractory material in an end regenerator, preheating the media for combustion and cooling the refractory material in the regenerator for the cooling step, and passing it thence into a combustion chamber; effecting combustion therein of the preheated gaseous media and flowing the products of combustion first through non-combustible refractory material in an intermediate regenerator and thereby heating the refractory material therein to the reaction temperature for the endothermic reaction step, passing the combustion products thence out through non-combustible refractory material in another end regenerator and thereby heating the same for the preheating step and cooling the waste gas to below 300° C.; then leading the gaseous hydrocarbons and steam to be reacted through the non-combustible refractory material of the three regenerators of the set in series, first of all countercurrent to the direction the preceding heating-up gases took, and concluding with a run in the same direction as the preceding heating-up gases took, and thereby producing the carbon monoxide and hydrogen endothermic reaction products and cooling the end regenerator through which the gaseous heating media of the cycle entered to a temperature at which the waste gases of the heating-up step of the next cycle will leave at below 300° C., the direction of flow through the set of gaseous heating media for the cycle being countercurrent to the direction of flow of the concluding run of the gas for reaction of the previous cycle.

4. A cycle for use in a process of carrying out endothermic gas reactions of gaseous hydrocarbon and steam at high temperature to produce carbon monoxide and hydrogen endothermic reaction products involving a preheating step preceding an endothermic reaction step and a cooling step following the endothermic reaction step, which cycle comprises: passing gaseous combustion media for the cycle first through non-combustible refractory material in an end regenerator, preheating the media for combustion and cooling the refractory material in the regenerator for the cooling step, and passing it thence into a combustion chamber; effecting combustion therein of the preheated gaseous media and flowing the products of combustion first through non-combustible refractory material in an intermediate regenerator and thereby heating the refractory material therein to the reaction temperature for the endothermic reaction step, passing the combustion products thence out through non-combustible refractory material in another end regenerator and thereby treating the same for the preheating step and further cooling the waste gas; then leading the gaseous hydrocarbons and steam to be reacted through the non-combustible refractory material of the three regenerators of the set in series, first of all countercurrent to the direction the preceding heating-up gases took, and concluding with a run in the same direction as the preceding heating-up gases took, and thereby producing the carbon monoxide and hydrogen endothermic reaction products and cooling the end regenerator through which the gaseous heating media of the cycle entered to a temperature at which the waste gases of the heating-up step of the next cycle will leave at a low temperature, the direction of flow through the set of gaseous heating media for the cycle being countercurrent to the direction of flow of the concluding run of the gas for reaction of the previous cycle.

WILLY LINDER.